Figure 1:
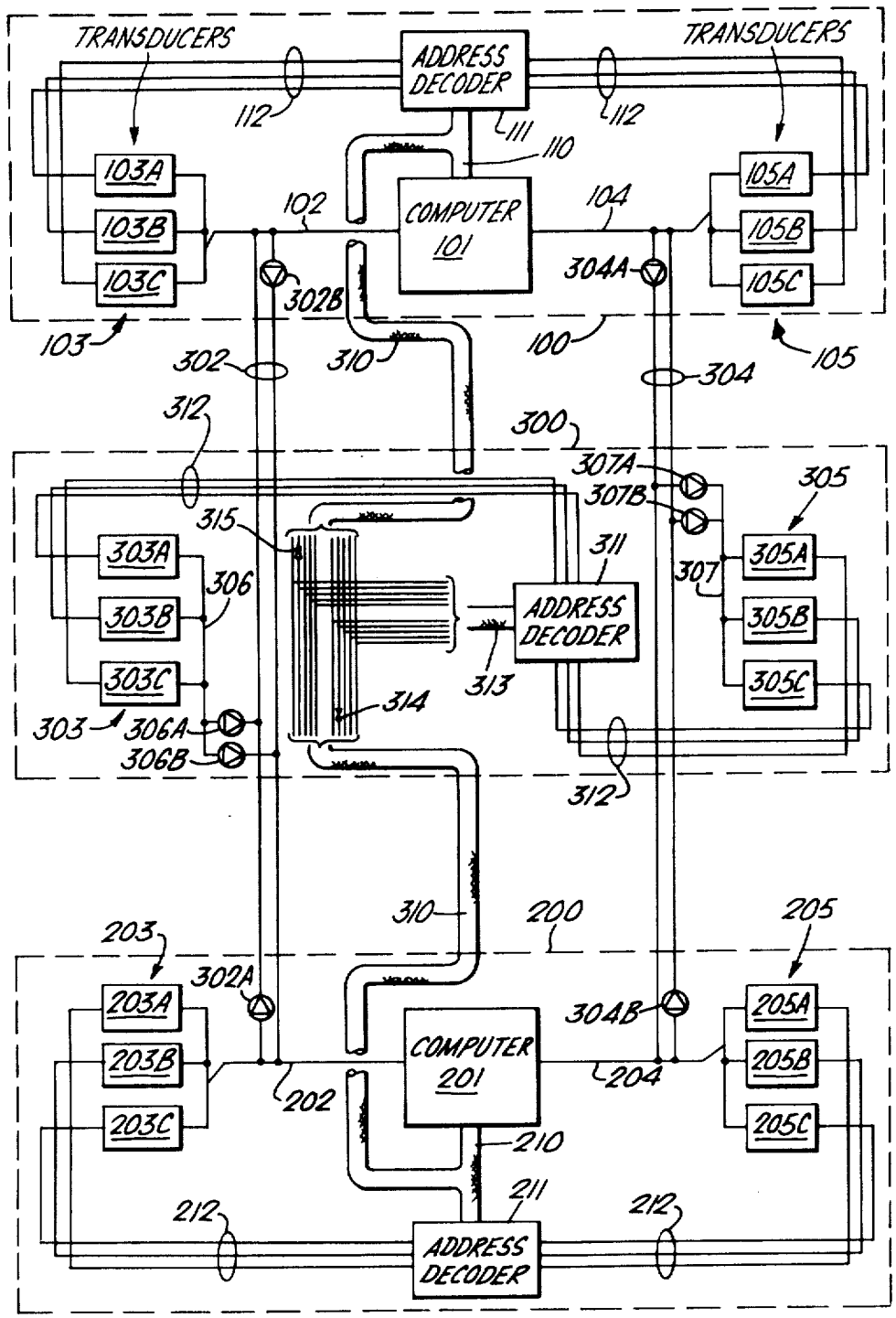

United States Patent [19]

Roberts

[11] 4,387,426
[45] Jun. 7, 1983

[54] DIGITAL DATA PROCESSING SYSTEM

[75] Inventor: Eric Roberts, Bristol, England

[73] Assignee: Rolls-Royce Limited, London, England

[21] Appl. No.: 181,973

[22] Filed: Aug. 28, 1980

[30] Foreign Application Priority Data

Sep. 6, 1979 [GB] United Kingdom ................ 7930885

[51] Int. Cl.³ ........................................... G06F 11/20
[52] U.S. Cl. .................................. 364/200; 364/900; 371/11
[58] Field of Search .................... 364/200, 900; 371/9, 371/11

[56] References Cited

U.S. PATENT DOCUMENTS

| 3,768,074 | 10/1973 | Sharp | 371/11 |
|---|---|---|---|
| 3,786,433 | 1/1974 | Notley | 364/200 |
| 3,875,384 | 4/1975 | Davis | 371/9 |
| 3,875,390 | 4/1975 | Eccles | 371/11 |
| 4,032,757 | 6/1977 | Eccles | 371/11 |
| 4,231,015 | 10/1980 | Union | 364/200 |

Primary Examiner—Charles E. Atkinson
Assistant Examiner—Michael R. Fleming
Attorney, Agent, or Firm—Stevens, Davis, Miller & Mosher

[57] ABSTRACT

A data processing system comprising first and second computers (101;201) and respectively associated first and second transducers (103A; 203A) connected via respective first and second data highways (102;202) to their associated computers, the transducers being enabled upon receipt of associated predetermined address codes output by the computers on respective first and second address highways (110;210), the address highways being linked (310), the data highways being linked (302) and the computers and transducers being arranged so that each computer addresses its associated transducer with the same first address code. In order to obviate the need for complicated switching the address link comprises a converter (314,315) for converting an address code on either address highway into a different, related address code on the other address highway, and each computer is arranged to address its non-associated transducer with the same second address code convertible into the first address code by the converter.

Where the address codes are binary digital codes the converter may be an inverter for inverting a predetermined digit of an address code. The system may monitor the condition of the computers (FIG. 2, not shown) and enable a selected one of the computers accordingly. Each computer may be arranged normally to access its associated transducer and to access its non-associated transducer if a fault occurs in its associated transducer. A third transducer (303A) may also be provided.

8 Claims, 5 Drawing Figures

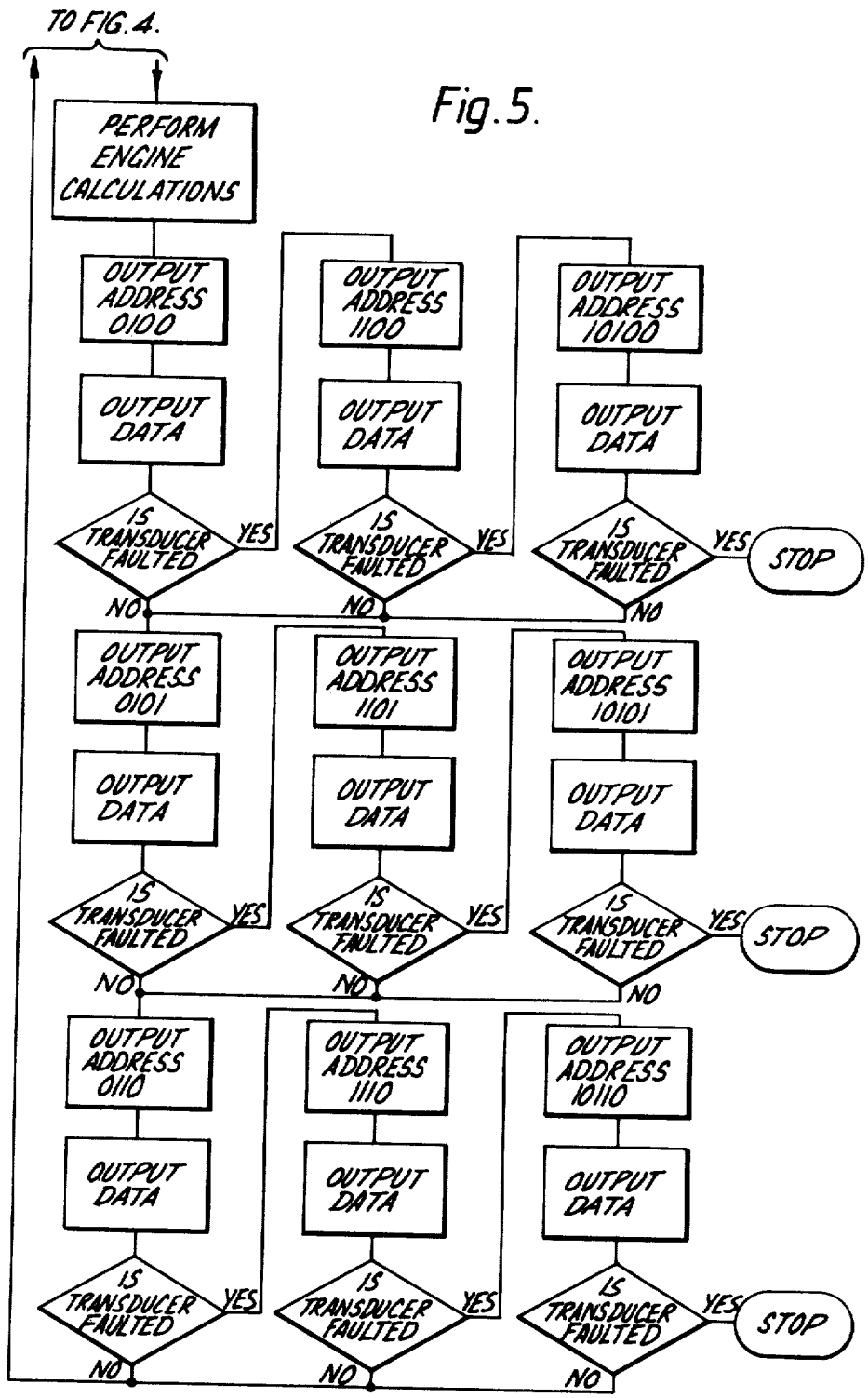

DIGITAL DATA PROCESSING SYSTEM

DESCRIPTION

This invention relates to a data processing system for use in control of a plant. Such a system for use in the control of a gas turbine engine plant comprises two identical computers either one of which has access to the plant through either of two identical transducers required for the conversion of data transmitted to or from the plant. The duplication of the computers and transducers is provided for safety. Typically, only one of the computers is enabled while the other acts as a standby in case of a fault in the one computer. The change from the one computer to the other may be effected by an automatic fault detection system or manually. Similarly, one of the transducers is enabled while the other acts as a standby although the transducers may be used simultaneously or alternately. The change from one transducer to the other, or the disabling of a faulty one of the transducers, is effected by an automatic fault detection system.

In addition to the computers being of identical construction, it is also desirable for the two computers to have identical programmes and to accede to the transducers through identical address systems. However, to make this possible it has in the past been necessary to provide a switching system in the connection between the computers and the transducers and substantial programme time was occupied with the control of that switching system. It is an object of this invention to reduce or overcome this difficulty.

According to this invention there is provided a data processing system comprising:

a first computer and a second computer;

a first transducer associated with said first computer and a second transducer associated with said second computer;

a first data highway connected between said first computer and said first transducer to convey data therebetween and a second data highway connected between said second computer and said second transducer to convey data therebetween;

first address means connected with said first transducer for enabling said first transducer upon receipt of a predetermined address code associated with said first transducer and second address means connected with said second transducer for enabling said second transducer upon receipt of a predetermined address code associated with said second transducer, a first address highway connected between said first computer and said first address means to convey address codes therebetween and a second address highway connected between said second computer and said second address means to convey address codes therebetween;

a data link connected between said first data highway and said second data highway; and an address link connected between said first address highway and said second address highway, said computers and said transducers being arranged so that each said computer addresses its associated transducer with a first predetermined address code which is the same for each said computer, wherein said address link comprises first converter means for converting an address code on either one of said address highways into a different, related address code on the other one of said address highways; and each said computer is arranged to address its non-associated said transducer with a second predetermined address code which is the same for each said computer, said second predetermined address code being so related to said first address code as to be convertible into said first address code by said first converter means.

In operation, the first address code output by the first computer enables the first transducer but the second transducer is not affected because, although the second transducer is enablable by the first address code, the converter means operate for the address code reaching the second transducer to be different from the first address code. On the other hand, if the first computer outputs the second address code the first transducer is not affected but the converter means convert the second address code into the first address code for application to the second transducer and so the second transducer is enabled. A corresponding situation exists if the second computer outputs the second address code.

Preferably said address codes are binary digital address codes and said first converter means comprises first inverter means for inverting a first predetermined digit of a said address code.

Preferably the system further comprises monitoring means for monitoring the condition of said computers and for enabling a selected one of said computers accordingly.

Preferably the system further comprises fault detecting means for causing either said computer to change from accessing its associated said transducer to accessing its non-associated said transducer in the event of a fault occurring in its associated said transducer.

Preferably the system further comprises a third transducer; a third data highway connected between said third transducer and said first and second data highways to convey data therebetween; third address means connected with said third transducer for enabling said third transducer upon receipt of a predetermined address code associated with said third transducer; and a third address highway connected between said third address means and said first and second address highways to convey address codes therebetween, and each computer is arranged to address said third transducer with a third predetermined address code which is the same for each said computer and is different from said first address code and said second address code.

Preferably said predetermined address code associated with said third transducer is said first address code and said third address highway comprises second converter means for converting said third address code on said first or said second address highway into said first address code on said third address highway.

Preferably said address codes are binary digital codes and said second converter means comprises second inverter means for inverting a second predetermined digit of a said address code.

Preferably the system further comprises fault detecting means for causing either said computer to change from accessing its associated said transducer to accessing its non-associated said transducer in the event of a fault occurring in its associated said transducer and to change from accessing its non-associated said transducer to accessing said third transducer in the event of a fault occurring in its non-associated said transducer.

Figure 2:
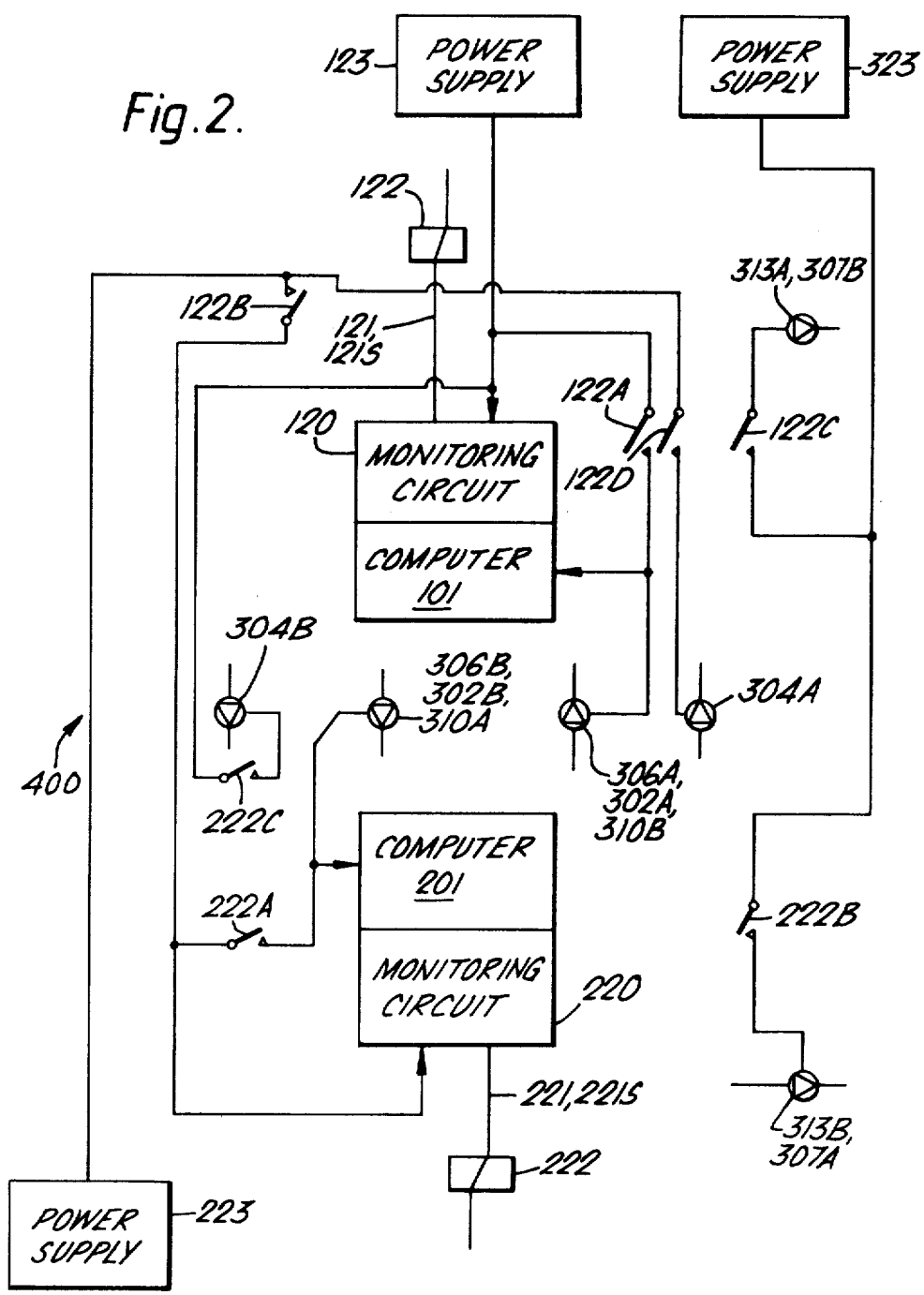
Figure 3:
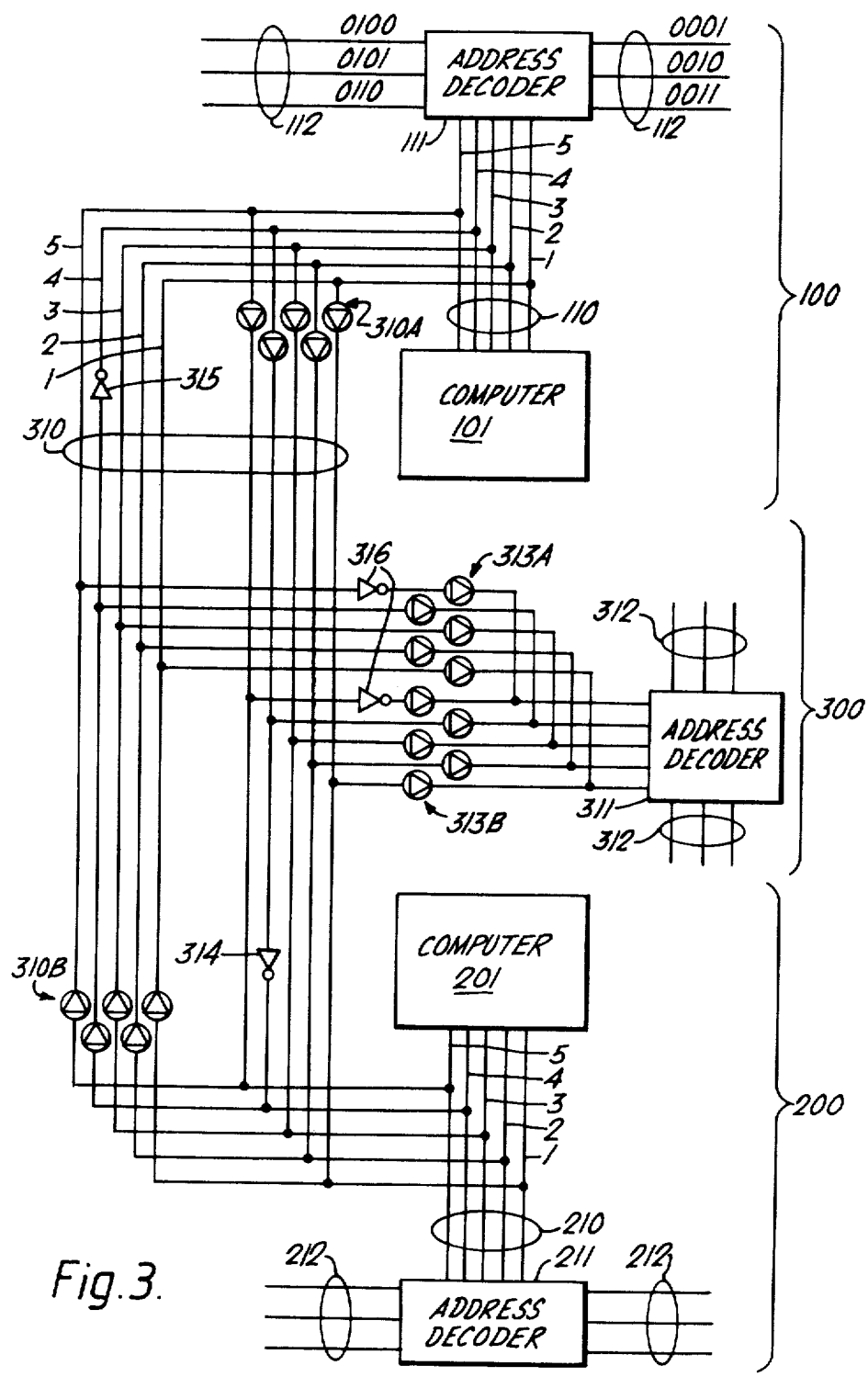
Figure 4:
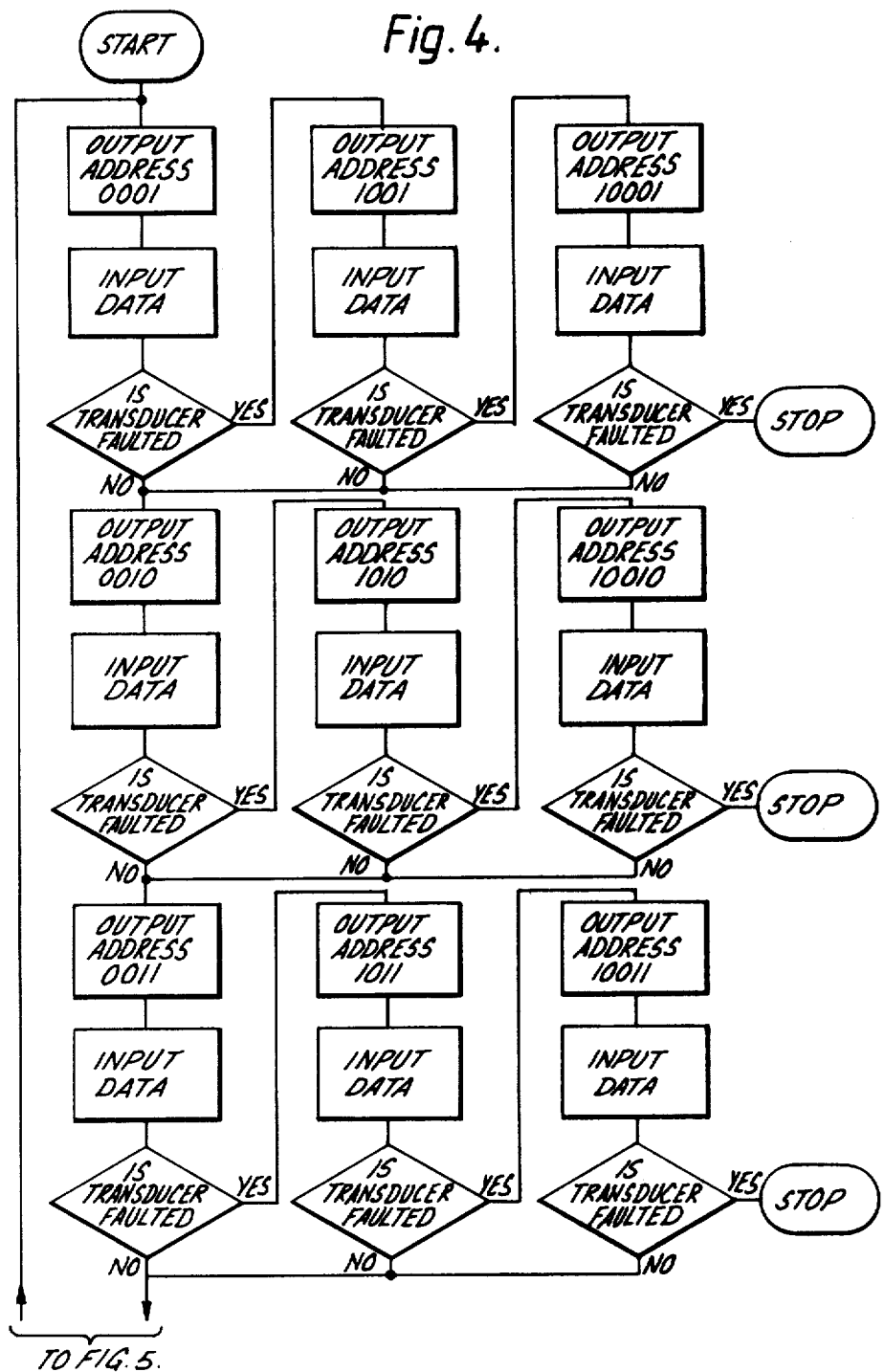

An example of a digital data processing system according to this invention will now be described with reference to the accompanying drawings wherein:

FIG. 1 is an overall system diagram;
FIG. 2 is a detail of FIG. 1;
FIG. 3 is a further detail of FIG. 1, and
FIGS. 4 and 5 show, in flow diagrammatic form, a program suitable for use in the system.

Referring to FIG. 1, a digital data processing system for use in controlling a gas turbine engine plant (not shown) comprises two computers 101 and 201 connected via a first, a second and a third highway system 100,200 and 300 respectively to three groups of input transducers 103,203,303 and three groups of output transducers 105, 205,305, each of the two computers having access to each of the input and output transducers. However, only one of the computers, say the computer 101, is normally operational while the other computer 201 is a standby computer which is enabled only in response to a fault occurring in the computer 101, a safety system 400 (see FIG. 2) being provided for the switchover from one computer to the other. The transducers are input and output devices for the gas turbine engine plant.

The transducers may also be regarded as first transducers 103,105 used by the first computer 101 except when there is a fault in that computer or one of those transducers, while the transducers 203,205 may be regarded as second transducers similarly related to the second computer 201. Three individual transducers are shown within each respective group and are denoted A, B and C. It will be appreciated more or fewer transducers may be utilised in each group, depending on the requirements of a particular system.

The respective input transducers 103 receive engine condition data such as temperatures, pressures and speeds and convert these data into the digital form required by the computers. The computers are programmed to use the input data for computing engine operating data such as fuel flow rates, engine intake settings and engine exhaust nozzle settings. The output transducers 105 convert the output data into the mechanical or other form required for effecting these rates and settings.

The groups of transducers 103 and 203 are duplicates, as are the transducers 105 and 205, i.e. the transducers 103A and 203A are a pair of identical devices and so on. The groups of transducers 303 and 305 may be provided for a different function from the other transducers, and if so need not be identical to the other transducers. Alternatively, the transducers 103,203 and 105,205 and 303,305 may be triplicates in a system where all these transducers have the same function.

The highway system 100 comprises a data input highway 102 from the transducers 103 and a data output highway 104 to the transducers 105. Data are transmitted along the highway 102 or 104 when a particular transducer is enabled by an address system to be described. The highway system 200 comprises corresponding data input and output highways 202 and 204 between the transducers 203 and 205 respectively and the computer 201. The highway system 300 comprises a data link line 302 connected at its respective ends to the data input highways 102 and 202 and intermediate between its ends the highway 302 is connected by a branch 306 to the transducers 303. Correspondingly, a data link line 304 is connected at its respective ends to the data output highways 104 and 204 and intermediate between its ends by a branch 307 to the transducers 305. It is clear therefore that the highways 102,202 or 306 provide data access for either computer 101 or 201 to any of the transducers 103, 203 or 303. Similarly, the highways 104,204 and 304 provide data access for either computer 101 or 201 to any of the transducers 105,205 or 305.

Although not so shown, it will be appreciated that each transducer may be connected to its respective data highway via a respective opto-electronic coupler. The opto-electronic couplers will normally be switched on, but may be individually switched, under computer control, if a transducer develops a fault which would contaminate the data highways.

The highway system 100 includes an address highway 110 connected between the computer 101 and an address decoder 111 having individual connections 112 to the respective transducers of the groups 103 and 105. The computer 101 is programmed to access the respective transducers of the groups 103 and 105 in a given order by outputting binary address codes on the highway 110. The decoder 112 then converts the code into an enabling signal which is output to the transducer concerned. Thus, transducer input and output data are transmitted on the highway 102 or 104 only when a given one of the transducers 103 or 105 is specifically enabled by an enabling signal 112S.

Correspondingly, the highway system 200 includes an address highway 210 connected to an address decoder 211 which is in turn connected by individual enabling lines 212 to the respective transducers of the groups 203 and 205.

Further, the highway system 300 has an address link highway 310 connected at its ends to the address highways 110,210 and intermediate between its ends to an address decoder 311 which is in turn connected by individual enabling lines 312 to the respective transducers of the groups 303 and 305.

It will be seen that the arrangement of the address highways 110, 210 and 310 gives either computer 101 or 102 access for enabling any one of the transducers of the groups 103,105,203,205,303 or 305.

Referring now also to FIG. 2, a fault detection system 400 has a monitoring circuit 120 connected to the computer 101 and adapted to produce, on an output line 121, a fault signal 121S which is binary 1 if the computer is functioning correctly and binary 0 if there is a fault in the computer. If the fault signal 121S is at "1" a relay 122 is energised to connect a power supply 123 through normally open contacts 122A to the computer 101. Simultaneously, the relay 122 holds open normally closed contacts 122B to disconnect a power supply 223 of the computer 201. If the computer 101 fails, the monitoring circuit 120 causes the signal 121S to go to "0" with the effect that the contacts 122A open to de-power the computer 101 while the contacts 122B close to empower a monitoring circuit 220 of the computer 201. The latter monitoring circuit 220 has a fault signal output line 221 to a relay 222 having normally open contacts 222A in a supply line of a power supply 223. The circuit 220 has a delay unit which puts a temporary "1" signal on to the line 221 to close the contacts 222A to empower the computer 201. If the computer 201 is in order the monitoring circuit maintains the signal 221S at "1" when the delay has expired.

Referring now also to FIG. 3, the fault detection system further includes opto-electronic couplers 302A, 302B, 304A, 304B, 310A, 310B in the link highways 302, 304, 310 and couplers 306A, 306B and 307A, 307B in the branches 306, 307 of these highways to the transducers 303, 305. Similar couplers 313A, 313B are provided in the branch 313.

Each said coupler comprises a light-emitting diode separated by a transparent electrical insulating material from a photodiode in turn connected to an amplifier. The amplifier requires a power supply and the coupler can be switched on or off by switching of that supply. The power supply to the couplers 306A, 302A and 310B is derived from the supply 123 so that these couplers are depowered, together with the computer 101 itself, when there is a fault in that computer. The power supply to the couplers 306B, 302B and 310A is derived from the supply 223 so that the latter couplers are linked to the status, whether on or off, of the computer 201. The couplers 304A, 304B are powered from the power supplies 223 and 123 respectively and switched through normally open contacts 122C and 122D of the relays 122 and 222 respectively to provide electrical isolation between the data output highways 104 and 204. The couplers 313A, 307B are fed by a separate power supply 323 which is switched by normally open contacts 122C of the relay 122. The couplers 313B, 307A are also fed by the supply 323 but are switched by normally open contacts 222B of the relay 222.

It will be noted that the couplers of any one line 302, 304, 310 are a pair of such couplers, e.g. 302A, 302B arranged in parallel. As regards the link highways 302, 304, 310, the reason for this pair arrangement is that the couplers are uni-directional so that two couplers arranged in separate lines are required for operation of the link by either computer 101, 201, and one of the couplers of each pair must always be switched off as otherwise an unstable loop would be formed and signal transmission would become impossible. As regards the branches 306, 307, 313, which of course require only uni-directional transmission, the reason for the pair arrangement of couplers is to preserve the isolation provided by the couplers in the link highways 302, 304, 310. One of two couplers in the respective branches 306, 307, 313 is always switched off by the contacts 122C or 222B to avoid parallel data on address paths along lines which would have different propagation velocities.

Each computer 101, 201 is programmed to read data from the input transducers and to prepare output data to the output transducers, the respective transducers being addressed in programmed order through the address system. Each computer has a store containing a series of binary numbers or address codes defining the address of all the transducers and these address codes are the same for each computer to satisfy the requirement for programmes in the two computers to be the same and for the address decoders 111 and 211 to be the same. The following table shows the addresses for the eighteen transducers shown for each of the computers 101 and 201.

TABLE

| | TRANSDUCER | ADDRESS CODE | |
|---|---|---|---|
| Computer 101 | 103A | 0001 | |
| | 103B | 0010 | |
| | 103C | 0011 | |
| | 105A | 0100 | A |
| | 105B | 0101 | |
| | 105C | 0110 | |
| | 203A | 1001 | |
| | 203B | 1010 | |
| | 203C | 1011 | |
| | 205A | 1100 | B |
| | 205B | 1101 | |
| | 205C | 1110 | |
| Computer 201 | 203A | 0001 | |
| | 203B | 0010 | |
| | 203C | 0011 | |
| | 205A | 0100 | A |
| | 205B | 0101 | |
| | 205C | 0110 | |
| | 103A | 1001 | |
| | 103B | 1010 | |
| | 103C | 1011 | |
| | 105A | 1100 | B |
| | 105B | 1101 | |
| | 105C | 1110 | |
| Computers 101, 201 | 303A | 10001 | |
| | 303B | 10010 | |
| | 303C | 10011 | |
| | 305A | 10100 | C |
| | 305B | 10101 | |
| | 305C | 10110 | |

It will be noted that the computer 101 addresses the transducer 103A through the same code, i.e. binary 0001, as required by the computer 201 to address the transducer 203A, and so on. Further, the address codes are divided into two groups A, B of which the group A is given to the computer 101 for addressing the transducers 103,105 and to the computer 201 for addressing the transducers 203, 205 while group B is given to the computer 101 for addressing the transducers 203, 205 and to the computer 201 for addressing the transducers 103, 105. The groups A, B differ only in that their most significant digits are binary 0 and binary 1 respectively. In the highways 110, 210, 310 the four digits of the binary address codes are carried by respective wires 1, 2, 3, 4. The wire 4 carries the most significant digit of the binary number. In the highway 310 the wire 4 contains a pair of inverters 314, 315 for inverting the most significant digit of the address code. Further, the identical address decoders 111 and 211 are adapted to respond to group A codes only, i.e. not to respond to any group B codes. The effect of the arrangement described is that a group A code output by the computer 101 enables one of transducers 103,105 but cannot enable the corresponding one of the transducers 203, 205 because the decoder 211 cannot respond to group B addresses. On the other hand, if the computer 101 outputs a group B code, the appropriate one of the transducers 203, 205 is enabled because the inverter 314,315 changes the code to a group A code to which the decoder 211 can respond; the transducers 103,105 are not affected because the decoder 111 does not respond to the group B codes.

The transducers 303, 305 are addressed by codes of a group C shown in the above table. Group C is common to the computers 101, 201 and differs from groups A and B in that it has a fifth digit carried by a line 5 of the highways 110, 210 and 310. The line 5 is connected to the decoders 111, 211 and 311 along with the lines 1 to 4 but, as mentioned above, the decoders 111 and 211 respond only to Group A codes. An inverter 316, converts the binary 1 on line 5 to binary 0 so that the group C code is converted into a group A code before the address code is applied to the decoder 311. Therefore, the decoder 311 can be identical to the decoders 111, 211. Thus in a system in which the groups of transducers 103, 203, and 303 and 105, 205 and 305 are triplets, the address decoders may be the same, resulting in identical assemblies of address decoder and transducers 111, 103 and 105; 211, 203 and 205; and 311, 303 and 305. It will, of course, be appreciated that if it is desired for the address decoder 311 not to be the same as the address decoders 111 and 211, the inverters 316 can be dispensed with and the address decoder 311 can be adapted to respond directly to the Group C codes.

In normal operation of the system, therefore, as mentioned above, the computer 101 is enabled by the fault detection system 400 and accesses its associated transducers 103 and 105 using Group A address codes. In the event of a failure of computer 101 the fault detection system disables the computer 101 and enables the computer 201 which accesses its associated transducers 203 and 205 using Group A address codes.

However, each computer 101, 201 is programmed to monitor the condition of the transducers in known manner and, upon detection of a fault in a transducer which it wishes to address, each computer is programmed to address instead the same transducer associated with the other computer, e.g. 203B instead of 103B, or 105C instead of 205C, i.e. to use a similar Group B address code instead of a Group A address code. (If the transducers 303 and 305 are to be used as a triple set for the other transducers, the computers may be programmed to use a Group C address code when the transducers which would be addressed with similar Group A and Group B address codes are faulted).

A suitable program, in flow diagrammatic form, for the computers 101,201 to operate the above described system is shown in FIGS. 4 and 5.

Referring firstly to FIG. 4 the enabled computer 101 to 201 first addresses its input transducer A, reads into the computer the data on the data highway (i.e. the engine condition data output from its enabled transducer A) and tests whether the transducer is faulted. This testing may be done in a known way, e.g. by checking that the output from the transducer is within specified limits of its last sampled value or by comparing its output with the output of one or more similar transducers. If the transducer is faulted, then the input transducer A of the other computer is addressed, has its output data read into the computer and is tested as above. If this transducer is also faulted then the output transducer 303A is addressed, read and tested. If, in the unlikely event that this transducer is also faulted, the program stops and a warning signal may be activated.

When a non-faulted input transducer A has been addressed, read and tested, the computer addresses, reads and tests its own, and if necessary the other computer's and the third, input transducer B until a non-faulted input transducer B has been read and tested and then does the same with the input transducers C.

Referring now to FIG. 5 the computer then processes the input data from the three non-faulted input transducers A, B and C in known manner to calculate the required engine operating data. The computer then outputs the engine operating data to the output transducers A, B and C in an analagous way to that described above with respect to the input transducers, the testing in this case being done in a known way, e.g. by using feedback, i.e. testing the output of a transducer against the data fed thereto.

Having output its set of operating data to three non-faulted output transducers A, B and C the computer returns (to FIG. 4) to read a new set of engine condition data and output a new set of engine operating data, and so on.

I claim:

1. A data processing system comprising:
a first computer and a second computer;
a first transducer associated with said first computer and a second transducer associated with said second computer;
a first data highway connected between said first computer and said first transducer to convey data therebetween and a second data highway connected between said second computer and said second transducer to convey data therebetween;
first address means connected with said first transducer for enabling said first transducer upon receipt of a predetermined address code associated with said first transducer and second address means connected with said second transducer for enabling said second transducer upon receipt of a predetermined address code associated with said second transducer;
a first address highway connected between said first computer and said first address means to convey address codes therebetween and a second address highway connected between said second computer and said second address means to convey address codes therebetween;
a data link connected between said first data highway and said second data highway; and
an address link connected between said first address highway and said second address highway, said computers and said transducers being arranged so that each said computer addresses its associated transducer with a first predetermined address code which is the same for each said computer, wherein said address link comprises first converter means for converting an address code on either one of said address highways into a different, related address code on the other one of said address highways; and
each said computer is arranged to address its non-associated said transducer with a second predetermined address code which is the same for each said computer, said second predetermined address code being so related to said first address code as to be convertible into said first address code by said first converter means.

2. A data processing system according to claim 1 wherein said address codes are binary digital codes and said first converter means comprises first inverter means for inverting a first predetermined digit of a said address code.

3. A data processing system according to claim 1 further comprising monitoring means for monitoring the condition of said computers and for enabling a selected one of said computers accordingly.

4. A data processing system according to claim 1 wherein the system further comprises fault detecting means for causing either said computer to change from accessing its associated said transducer to accessing its non-associated said transducer to accessing its non-associated said transducer in the event of a fault occurring in its associated said transducer.

5. A data processing system according to claim 1 further comprising:
a third transducer; a third data highway connected between said third transducer and said first and second data highways to convey data therebetween; third address means connected with said third transducer for enabling said third transducer upon receipt of a predetermined address code associated with said third transducer; and a third address highway connected between said third address means and said first and seco4d address highways to convey address codes therebetween, and each computer is arranged to address said third transducer with a third predetermined address code which is the same for each said computer, and is different from said first address code and said second address code.

6. A data processing system according to claim 5 wherein said predetermined address code associated with said third transducer is said first address code and said third address highway comprises second converter means for converting said third address code on said first or said second address highway into said first address code in said third address highway.

7. A data processing system according to claim 6 wherein said address codes are binary digital codes and said second converter means comprises second inverter means for inverting a second predetermined digit of a said address code.

8. A data processing system according to claim 5 wherein the system further comprises fault detecting means for causing either said computer to change from accessing its associated said transducer, to accessing its non-associated said transducer in the event of a fault occurring in its associated said transducer and to change from accessing its non-associated said transducer to accessing said third transducer in the event of a fault occurring in its non-associated said transducer.

* * * * *